Sept. 6, 1960 G. L. CLAPPER 2,951,950

VARIABLE PULSE WIDTH CONTROL

Filed Sept. 4, 1956

INVENTOR.
GENUNG L. CLAPPER

BY

Dewey J. Cunningham

ATTORNEY

United States Patent Office 2,951,950

Patented Sept. 6, 1960

2,951,950

VARIABLE PULSE WIDTH CONTROL

Genung L. Clapper, Vestal, N.Y., assignor to International Business Machines Corporation, New York, N.Y., a corporation of New York Filed Sept. 4, 1956, Ser. No. 607,609

2 Claims. (Cl. 307—88.5)

Figure 1:
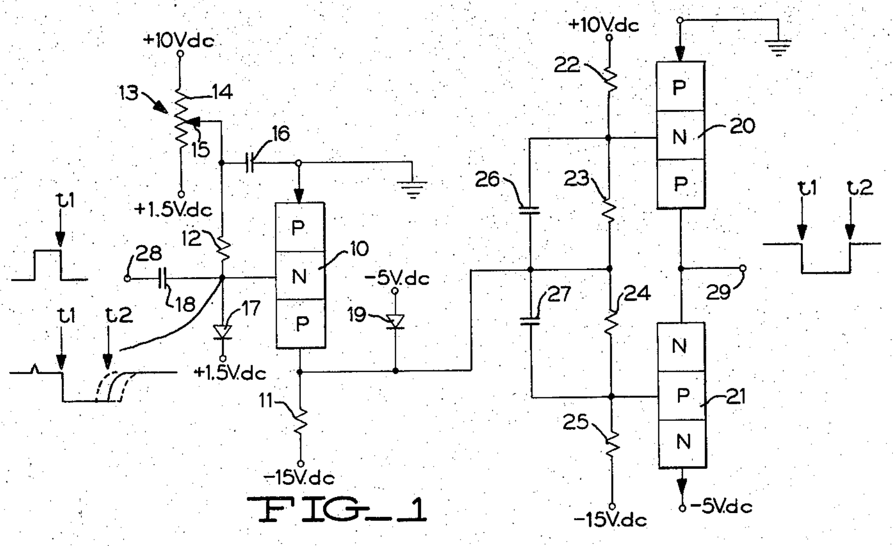

This invention relates to signal translating apparatus, and particularly to an arrangement for generating variable width pulses.

The problem of minority carrier storage in transistors connected in a grounded emitter configuration has long plagued circuit designers where the ultimate in frequency response is desired from the circuit. In such a circuit configuration, the total base current is the difference between the emitter and collector currents. This difference is quite small for most transistors, being about two percent of the emitter current. Thus, the transistor may exhibit current amplification properties and be driven from a relatively high impedance source. However, if the driving current applied to the base is very large, the collector will saturate. In this case, the positive feedback mechanism for adjusting the collector and emitter currents is not operative and all remaining base current must flow through the emitter. The elimination of the excess minority carriers takes an appreciable time to accomplish, during which time the transistor is held in its conductive state.

The present invention utilizes the minority carrier storage effect to advantage in a grounded emitter circuit to produce variable width output pulses in response to an input signal. Briefly, the invention comprises a transistor having its emitter electrode connected to a fixed potential and its collector electrode connected through a resistor to a D.C. potential different from the emitter potential. The base electrode of the transistor is connected to a point between a variable source of D.C. potential and one electrode of a unidirectional conducting device, the other electrode of said unidirectional conducting device having a fixed potential applied thereto. The input signal is coupled by a capacitor to the base of the transistor. In the present invention, two embodiments are illustrated, one of the embodiments utilizing a PNP junction transistor and the other embodiment utilizing an NPN junction transistor. Thus, the input pulses applied to the base of each transistor will be of a different polarity. The arrangement is such that during a portion of the input signal, the capacitor will be charged through the unidirectional conducting device connected to the base electrode. However, when the input voltage shifts to a new level, a sharp change in voltage is applied to the base electrode, the unidirectional conducting device being reverse biased at this time. The voltage applied to the base electrode drives the transistor into saturation so that it conducts heavily. The time duration of heavy saturation is determined by the particular voltage value of the afore-mentioned variable source of D.C. potential to which the base electrode is connected. After a prescribed period of time, as determined by the value of said variable source of D.C. potential, the transistor goes out of conduction. The output from the collector electrode is clipped and supplied to a complementary inverter driver whose output is a substantial square wave pulse, the leading edge of which is in coincidence with the beginning of heavy saturation in the transistor, and the trailing edge of which is in coincidence with the time the transistor goes out of heavy saturation.

Accordingly, it is a primary object of the present invention to provide a new and improved signal translating apparatus for producing variable width pulses.

Another object of the invention is to utilize the minority carrier storage effect in a transistor circuit connected in a grounded emitter configuration to advantage in producing output pulses whose duration can be reliably controlled in a simple manner.

Other objects of the invention will be pointed out in the following description and claims and illustrated in the accompanying drawings, which disclose, by way of examples, the principle of the invention and the best mode, which has been contemplated, of applying that principle.

Figure 2:
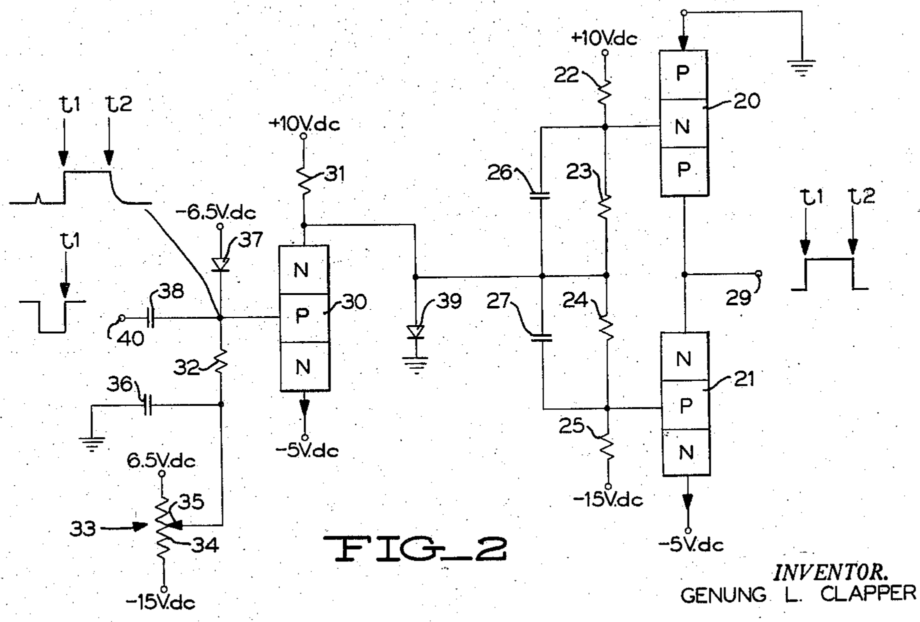

In the drawings:

Fig. 1 is a schematic diagram of the present invention which utilizes a PNP junction type transistor; and Fig. 2 is a schematic diagram of a circuit which is the equivalent of the Fig. 1 circuit, but which utilizes an NPN junction type transistor.

Similar reference numbers designate similar parts throughout the several views.

Referring now to Fig. 1, there is provided a PNP junction type transistor 10 having its emitter connected to ground and its collector connected by way of a resistor 11 to a negative source of D.C. potential. The convention used in the drawings for illustrating the various electrodes of the transistors is that the emitter electrode of a PNP transistor is always connected to the upper P-type region and is in the form of an arrow which points toward the P-type region. The collector electrode is connected to the lower P-type region and the base electrode is connected to the N-type region. Where NPN transistors are illustrated, the collector electrode is always connected to the upper N-type region while the emitter electrode is in the form of an arrow which is connected to the lower N-type region, the arrow pointing away from the N-type region. The base electrode is connected to the P-type region.

The base of transistor 10 is connected by way of a resistor 12 to a variable source of D.C. potential 13. This variable source of D.C. potential has been illustrated in the drawings in the form of a potentiometer comprising a resistance element 14 and a slider 15. The upper end of the resistance element is connected to a positive source of D.C. potential and the lower end of the resistance element is connected to a positive source of D.C. potential somewhat lower than the last-mentioned source of D.C. potential. A decoupling capacitor 16 is arranged between slider 15 and ground for filtering out transients in the voltage at the slider. The base of transistor 10 is also connected to the plate of diode 17 whose cathode is connected to a positive source of D.C. potential. The input signal is adapted to be applied to an input terminal 28 and may be similar to that illustrated adjacent the last-mentioned terminal. This input signal is coupled by way of a capacitor 18 to the base electrode of transistor 10.

The arrangement is such that under normal conditions the base of transistor 10 will be at a slightly more positive voltage than that applied to the cathode of diode 17. Under these circumstances, it will seen that the emitter to base connection of the transistor is reverse biased, i.e., the base is more positive than the emitter. This, of course, prevents transistor 10 from conducting. As the input signal illustrated as being applied to terminal 28 goes relatively positive, only a slight change in potential results at the base of transistor 10, this being due to the fact that when the terminal 28 is raised, current will flow through capacitor 18 and diode 17 so as to charge capacitor 18. As soon as the input signal drops relatively negatively, as indicated at time $t1$, a sharp drop in voltage results at the base of transistor 10. This causes transistor 10 to go into heavy saturation, thereby resulting in a rise in voltage at the collector of transistor 10.

A diode 19 is arranged with its cathode connected to the collector of transistor 10 and its plate connected to a negative source of D.C. potential, this last-mentioned potential being more positive than the negative source of D.C. potential connected to the lower end of resistor 11. In this manner, the collector of transistor 10 is prevented from going below the potential connected to the plate of diode 19 during the times when transistor 10 is not conducting. Therefore, when an attempt is made to place transistor 10 in conduction, the collector only has to rise to approximately ground potential and the transistor will be in heavy saturation.

As shown in the waveform for the base of transistor 10, the base potential will stay relatively negative for a prescribed period of time and then at time $t2$ will begin to return positively and turn the transistor 10 out of conduction. The time at which the base potential begins to rise positively is determined by the voltage value on slider 15. Thus, by moving the slider along the resistance element 14, it is possible to cause the base voltage to rise either earlier or later than the time $t2$, as indicated in dotted lines on the signal waveforms for the base of transistor 10.

The output voltage from the collector of transistor 10 is supplied to a complementary inverter driver which comprises a PNP junction type transistor 20 and an NPN junction type transistor 21. Each of the transistors is connected in a grounded emitter configuration with their collectors commoned and connected to an output terminal 29. It will be noted that the emitter potential for transistor 21 is more negative than the emitter potential of transistor 20.

A voltage divider comprising resistors 22, 23, 24 and 25 is arranged between a positive source of D.C. potential, which is connected to the upper end of resistor 22, and a negative source of D.C. potential, which is connected to the lower end of resistor 25. The collector of transistor 10 is connected to a point intermediate resistors 23 and 24, there being high frequency by-pass capacitors 26 and 27 connected in parallel with resistors 23 and 24, respectively. The base of transistor 20 is connected to a point intermediate resistors 22 and 23 while the base of transistor 21 is connected to a point intermediate resistors 24 and 25.

The voltage at the collector of transistor 10 will be at approximately −5 volts during times when transistor 10 is not in conduction, and will be at approximately ground potential during the intervals that transistor 10 is in conduction. Taking a time when the collector of transistor 10 is at approximately −5 volts, it will be seen that the point between resistors 23 and 24 will also be at −5 volts. This means that there will be a fifteen volt drop from the upper end of resistor 22 to the lower end of resistor 23. The values of resistors 22 and 23 are proportioned such that under these circumstances the potential at the base of transistor 20 will be sufficiently below the emitter potential to allow transistor 20 to conduct. However, there is only a ten volt drop across resistors 24 and 25. Resistors 24 and 25 are proportioned such that the potential at the base of transistor 21 will be more negative than the emitter potential and thereby prevent transistor 21 from conducting. Under these circumstances, a relatively positive output voltage will be supplied from the output terminal 29.

As soon as transistor 10 goes into heavy saturation, the collector voltage rises to approximately ground potential and thereby causes the voltage at the base of transistor 20 to rise to such a point that transistor 20 will go out of conduction. On the other hand, the voltage at the base of transistor 21 will rise to a point where transistor 21 will be allowed to go into conduction. This causes the voltage at the output terminal 29 to drop toward the emitter potential of transistor 21. When transistor 10 goes out of heavy saturation, the collector voltage drops to −5 volts and transistor 20 will be placed in conduction and transistor 21 out of conduction, thereby resulting in a positive going voltage at terminal 29. As illustrated in the drawings, the output voltage at terminal 21 goes negative at time $t1$ when transistor 10 goes into heavy conduction, and goes positive at time $t2$ when transistor 10 goes out of heavy saturation. Also, as previously mentioned, the width of the pulse at terminal 29 can be varied by varying the potential at slider 15.

Referring to Fig. 2, there is illustrated a circuit which is the equivalent of the circuit shown in Fig. 1. However, an NPN junction type transistor 30 is used in lieu of the PNP transistor 10 illustrated in Fig. 1. Transistor 30 is also connected in a grounded emitter configuration, the emitter being connected to a negative source of D.C. potential and the collector being connected by way of a resistor 31 to a positive source of D.C. potential. The base of transistor 30 is connected by way of a resistor 32 to a variable source of D.C. potential illustrated generally by reference numeral 33. Hereagain, source 33 is illustrated as being in the form of a potentiometer comprising a resistance element 34 having a difference in potential applied thereacross and a slider 35. A filter capacitor 36 is connected between slider 35 and ground for eliminating possible fluctuations in the voltage appearing at slider 35. The base of transistor 30 is connected to the cathode of a diode 37 whose plate is connected to a negative source of D.C. potential.

An input signal is adapted to be applied to terminal 40 and may be in the form as illustrated. Terminal 40 is coupled by way of capacitor 38 to the base of transistor 30. In a circuit such as is shown in Fig. 2, a drop in voltage at terminal 40 results in charging capacitor 38 but produces very little change in the potential at the base of transistor 30, the transistor being presently biased off due to the fact that the base electrode is more negative than the emitter electrode. However, when the input signal goes relatively positive, as at time $t1$, the voltage at the base of transistor 30 rises sharply and results in transistor 30 going into heavy saturation. It will be seen that the base of transistor 30 is allowed to rise sharply due to the fact that capacitor 38 is charged and diode 37 is reverse biased. The time at which transistor 30 comes out of heavy saturation is determined by the voltage at slider 35. Thus, by moving slider 35, transistor 30 may be kept in heavy saturation for different periods of time.

The collector voltage at transistor 30 will be at approximately ground potential during the time when transistor 30 is not conducting, this being due to the fact that the collector is connected to the plate of a diode 39 whose cathode is connected to ground. Thus, even though the collector might try to rise toward the positive D.C. source of potential connected to the upper end of resistor 31, diode 39 will conduct and prevent the collector from going appreciably above ground. However, when transistor 30 goes into heavy saturation, the collector potential will drop toward the emitter potential. The collector output voltage is adapted to be supplied to a complementary inverter driver identical with that described above. Since the drivers are identical, the same reference numerals are used for the parts thereof and it is deemed that a detailed description of the operation of the driver is unnecessary. As shown, the output from terminal 29 of the driver in Fig. 2 is a positive pulse having a width determined by the difference in time between times $t1$ and $t2$.

It will be seen that I have provided a novel signal translating apparatus in which the minority character storage effect in the grounded emitter configuration of junction type transistors has been utilized to advantage to produce output pulses whose width may vary over a considerable range. I have found that pulses having a width of from 0.5 to 40 microseconds duration may be produced with the present invention. It has also been found that the width of the output pulses in the present invention does not change appreciably with a change in transistors. That is, substantially the same width output pulse may be produced when one transistor is replaced with a new transistor.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for producing variable width output signals in response to an input signal comprising a junction type transistor capable of being saturated and having a base, an emitter and a collector, an impedance having one end connected to the collector of said transistor, means for applying a potential difference between the emitter and the other end of said impedance, a variable voltage source, means connecting the base of said transistor to said variable voltage source, a unidirectional conducting device connected between said base and a reference voltage, an input terminal, a capacitor for coupling said input terminal to said base, said unidirectional conducting device being oriented to clamp said base when said input signal changes in a first direction so that said capacitor is charged, said transistor being driven into heavy saturation when said input signal changes in a direction opposite to said first direction, the time duration of said heavy saturation being determined by the value of the voltage supplied from said variable voltage source and in effect determining the width of each output signal.

2. Apparatus for producing variable width output signals in response to an input signal comprising a junction type transistor having a base, an emitter and a collector, an impedance having one end connected to the collector of said transistor, means for applying a potential difference between the emitter and the other end of said impedance, a variable voltage source, means connecting the base of said transistor to said variable voltage source, a unidirectional conducting device connected between said base and a reference voltage, an input terminal, a capacitor for coupling said input terminal to said base, said unidirectional conducting device being oriented to clamp said base when said input signal changes in a first direction so that said capacitor is charged, said transistor being caused to go into heavy saturation when said input signal changes in a direction opposite to said first direction, the time duration of said heavy saturation being determined by the value of the voltage supplied from said variable voltage source, an output terminal connected to the collector of said transistor, and means for clamping said collector to a predetermined voltage during the intervals that said transistor is not in heavy saturation.

References Cited in the file of this patent

UNITED STATES PATENTS

| | | |
|---|---|---|
| 2,595,208 | Bangert | Apr. 29, 1952 |
| 2,605,306 | Eberhard | July 29, 1952 |
| 2,622,212 | Anderson et al. | Dec. 16, 1952 |
| 2,644,896 | Lo | July 7, 1953 |
| 2,683,806 | Moody | July 13, 1954 |
| 2,750,452 | Goodrich | June 12, 1956 |
| 2,788,449 | Bright | Apr. 9, 1957 |
| 2,862,109 | Kruper | Nov. 25, 1958 |

OTHER REFERENCES

"Electronics," May 1956, vol. 29, No. 5, pp. 160, 161.